UNITED STATES PATENT OFFICE.

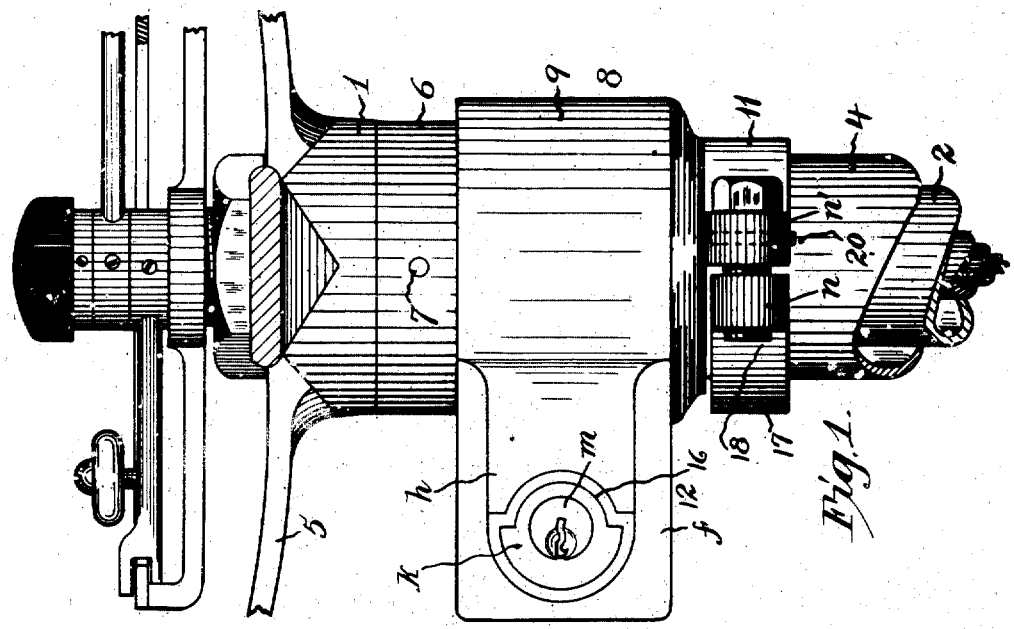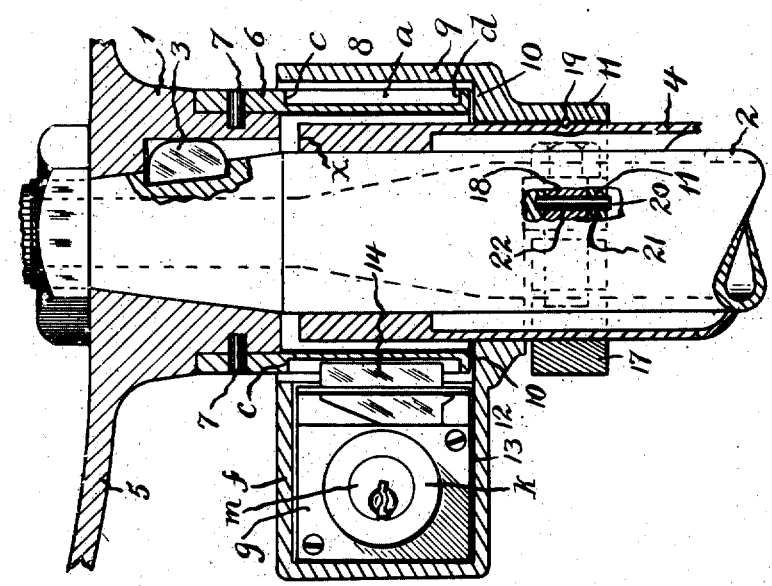

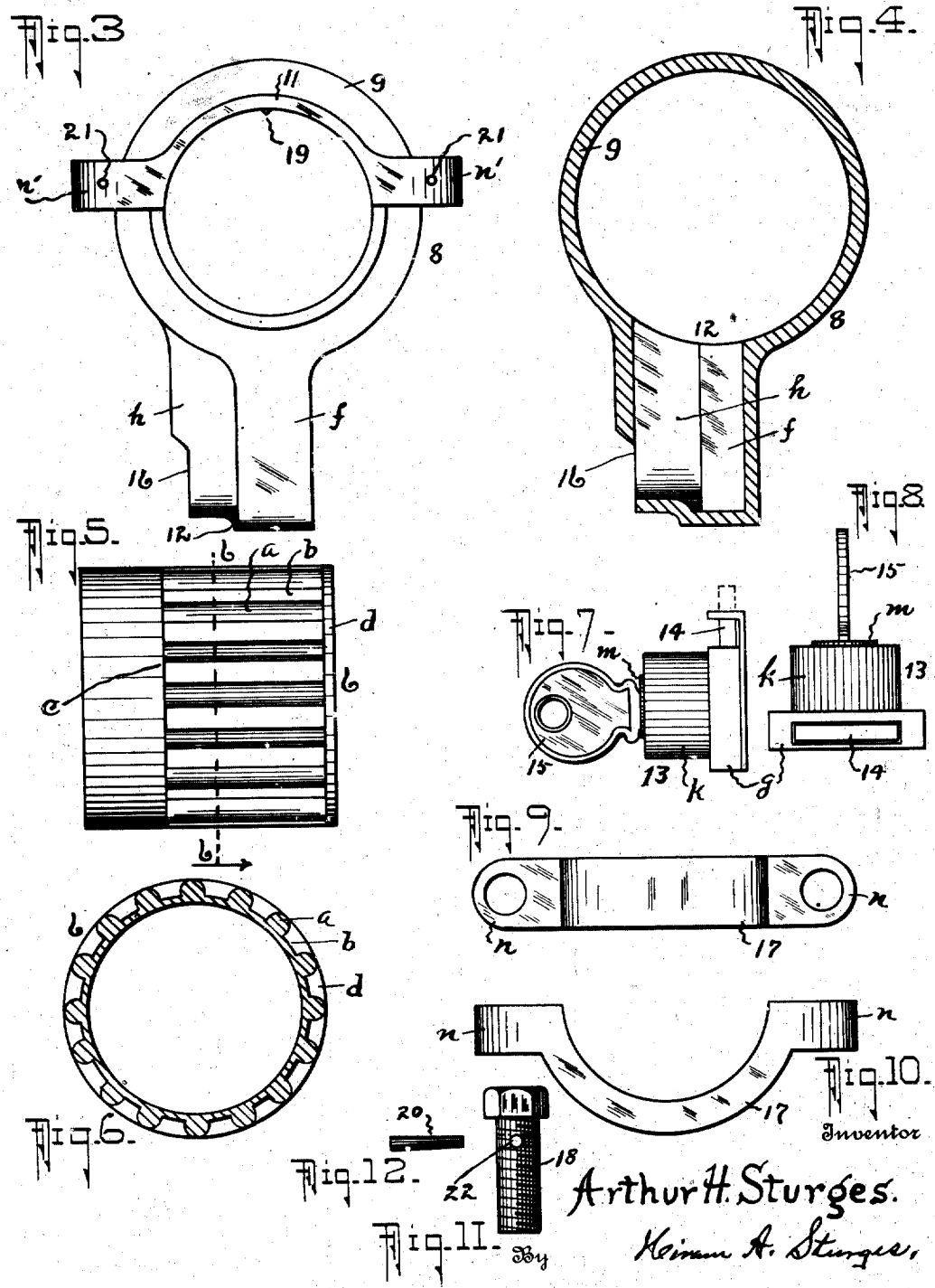

ARTHUR H. STURGES, OF OMAHA, NEBRASKA.

AUTOMOBILE-LOCK.

1,247,896.   Specification of Letters Patent.   Patented Nov. 27, 1917.

Application filed March 2, 1917. Serial No. 151,890.

*To all whom it may concern:*

Be it known that I, ARTHUR H. STURGES, a citizen of the United States, residing at Omaha, in the county of Douglas and State of Nebraska, have invented certain new and useful Improvements in Automobile-Locks, of which the following is a specification.

This invention relates to an improvement in automobile locks for controlling a rotation of the steering wheel to prevent use of the vehicle by unauthorized persons, and has for one of its objects to provide a lock which will be effective for this purpose and will consist of few and simple parts so that manufacture will be practical and economical, said parts to be durable and convenient in use. Another object is to provide a lock so arranged that it may be readily and conveniently applied at any time to the tubular standard and steering wheel of an automobile without requiring structural changes, and by any person of ordinary skill. Still another object is to provide such a construction for the lock that the steering shaft may be shifted longitudinally, without disarranging any of the parts, whenever an adjustment of the steering gear is required.

With the foregoing objects in view and others to be mentioned hereinafter, the invention presents a novel construction, combination and arrangement of parts, as described herein and claimed, and as illustrated in the accompanying drawing, wherein,—

Figure 1 is a plan view showing the hub of a steering wheel and the upper end portion of the tubular standard and steering shaft, with the lock applied, parts being broken away. Fig. 2 is a view in longitudinal section through the hub of the steering wheel and the locking device.

Fig. 3 is an end view of a casting used as a sleeve-holder and a housing for the lock, and Fig. 4 shows a transverse section of the same. Fig. 5 is a side view of the sleeve. Fig. 6 is a sectional view on line 6 6 of Fig. 5. Fig. 7 is a side view of a conventional lock employed, the locking bolt being shown in an upright position, a key being also shown. Fig. 8 is another view of the lock, the locking bolt being shown in a horizontal position. Fig. 9 is a side view and Fig. 10 is a plan view of a clamping-bar. Fig. 11 is a side view of one of the bolts for connecting the clamping-bars. Fig. 12 shows a side view of a keeper or dowel pin for the bolt shown in Fig. 11.

Referring now to the drawing for a more particular description, numeral 1 indicates the hub of an automobile steering wheel, the steering shaft 2 being usually secured thereto by means of the set-pin or key 3 and at 4 is indicated the tubular standard for containing the steering shaft, said member 4 being stationary with the vehicle frame. The parts mentioned are in general use upon automobiles, the steering wheel, a part of which is indicated at 5, being manually rotated for rotating the shaft to guide or control the direction of movement of the vehicle, the tubular standard being non-revoluble for the reason mentioned.

In order that the rotatable movements of the steering wheel may be under control, and to prevent unauthorized use of an automobile, I provide the locking device, consisting, in part, of a sleeve 6 having an annular rack formed between its ends, the elongated ridges $a$ and grooves $b$ of the rack having a length considerably in excess of the width of the locking-bolt 14 to be employed, the ends of the grooves defining end-walls or stops $c$ and $d$ for the annular rack, the sleeve having a diameter somewhat greater than the diameter of the tubular standard so that, normally, the sleeve will not prevent a free rotatable movement of the steering wheel, the outer ends of the sleeve being secured to the hub by any suitable means, the means herein shown being the pins or keepers 7, preferably having their outer ends disposed flush with the surface of the sleeve, so that they will not be removable.

At 8 is indicated a casting which provides a housing for the sleeve 6 and lock. It consists of a tubular part 9 having a diameter sufficient to lie adjacent to the sleeve 6 so that, normally, said sleeve 6 together with the steering wheel may be freely rotated, the inner end of said sleeve being disposed adjacent to the inwardly projecting ledge 10 of the casting.

Other parts of the casting or housing 8 consist of the clamping member 11 of semi-circular form, conforming substantially to the curvature of the standard, and disposed adjacent to and outwardly of the ledge 10, and a compartment or pocket 12 opening upon the inner side of the tubular part 9 for receiving a lock 13, said lock being of a conventional kind or pattern.

In order that the lock may be conveniently inserted in the pocket or compartment and may be securely held therein, said compartment is formed with a part $f$ which is rectangular in plan and rectangular in cross-section, corresponding to the shape of the casing $g$ of the lock which carries the locking bolt 14; also it is formed with a lesser compartment or recess $h$ conforming in width, substantially, to the length of the housing $k$ for containing the barrel $m$ which carries the key 15 of the lock.

A small aperture 16 is formed in the wall of the lesser compartment $h$ to permit the key 15 to be inserted in the lock, and it will be understood that, when assembling the parts, the lock is placed in the pocket from the inner side of the tubular part 9, its casing $g$ substantially filling the rectangular part $f$ of the compartment, the outer end of the housing of said lock being disposed adjacent to the small aperture 16 mentioned, and the bolt 14 being disposed radially of the tubular part 9 at the open end of the rectangular compartment $f$, and by use of the key, the bolt 14 may be thrown inwardly of the tubular part 9 or may be withdrawn therefrom.

It will be understood that the compartments $f$ and $h$ are for the purpose of providing such a housing for the lock that any displacement or removal thereof will be quite impossible. The rectangular part $f$ securely holds the rectangular casing $g$ so that the lock will remain in operative position at all times for throwing or retracting the bolt. The form of the lock and its casing shown herein is preferred, but may be changed, and if a different form is desired, the form of the pocket, of course, may be changed to conform thereto.

Numeral 17 indicates a second clamping member, this being of semi-circular form and provided at its ends with apertured lugs $n$ corresponding to the apertured lugs $n'$ of the clamping member 11 of the casting 8. The parts may be readily and conveniently assembled. The sleeve 6 is first mounted upon the hub as above described. The casting or housing 8 is then moved upon the standard toward the hub until its ledge 10 abuts upon the end of the sleeve 6, the tubular part 9 overhanging the grooves and ridges of the annular rack, so that, ordinarily, they will not be observable. The clamping bar 17 is then secured to the clamping bar 11 by use of the pair of threaded bolts 18, or equivalent means, in a manner to permanently secure the housing or casting 8 non-revoluble or in fixed relation upon the tubular standard, lugs or impaling elements 19 preferably being provided on the concaved side of the clamping-member 11, which, by compression effected by the bolts, will enter the convexed wall of the standard as additional holding means.

After the bolts have been rotated in a manner to cause a suitable degree of compresion of the clamping members upon the tubular standard, dowel pins 20 are inserted in recesses 21 with which the clamping bars 11 are provided, said pins traversing apertures 22 which are formed in the bolts; and in practice, the pins 20 are driven home, so that their ends will be disposed flush with the surfaces adjacent thereto, to prevent removal.

It will be seen that the device, aside from the conventional lock and bolts, requires three parts only, and therefore production may be comparatively inexpensive. The parts may be readily applied by an ordinary workman, and are so arranged that the device is convenient in use, and a longitudinal adjustment of the steering shaft may be effected whenever required, this being an important feature, as will be explained.

Since the sleeve 6 is secured to the hub, and the housing which carries the lock is secured to the standard 4, it is apparent that the construction permits a longitudinal adjustment of the steering shaft, said shaft, together with the hub and sleeve moving outwardly or inwardly of the stationary support or standard such limited distance as may be required for its adjustments, and on that account the ridges and grooves $a$ and $b$ must have a length considerably greater than the width of the conventional locking-bolt 14, so that said bolt may engage in a groove of the rack.

The clamping members, as described, are therefore of great advantage, since they provide means for readily securing the casting in such a manner that it will remain permanently upon such part of the standard, longitudinally thereof, as may be required, so that the ledge 10 will be disposed at a suitable distance from the end wall $d$ of the sleeve, and that the outer end $a$ of the standard will be disposed at a suitable distance from the hub, to permit the longitudinal adjustments of the steering shaft to be made, as mentioned, at any time after the device has been applied.

It is obvious that the stop-members $d$ of the sleeve 6 will prevent removal of the wheel when the bolt 14 is disposed in a groove $b$, said stop-member operating to limit an outward movement of the sleeve from the standard, this being of advantage and quite necessary to correct operation of the locking means, for the reason that, if the wheel and sleeve are removed, another wheel could be substituted for controlling the movements of the vehicle, which the present construction, it is considered, prevents.

Having fully described my invention, what I claim and desire to secure by Letters Patent is,—

1. A locking device, comprising, in combination with a non-revoluble, tubular standard and a normally rotatable steering shaft provided with a hub and disposed in the standard, a sleeve revoluble with the hub and provided with an annular rack circumscribing the standard, a casting having a tubular part circumscribing the annular rack and provided with a compartment opening on said tubular part, means to maintain the casting stationary with the standard in spaced relation with reference to the sleeve, and a locking-bolt disposed within the compartment and arranged to have a movement radially of the tubular part of the casting for engaging the annular rack to prevent a rotatable movement of said hub.

2. A locking device, comprising, in combination with a non-revoluble, tubular standard and a normally rotatable steering shaft provided with a hub and disposed in the standard, a sleeve movable with the hub and provided with an annular rack circumscribing the standard, a casting formed with a semi-circular clamping-bar and having a tubular part with a compartment opening thereon and provided with an inwardly projecting annular ledge defining a terminal of its tubular part, said casting being disposed with its tubular part circumscribing the annular rack, the clamping-bar being in engagement with the standard, a second semi-circular clamping-bar disposed in opposed relation to and connected with the first named clamping-bar for engagement with the standard to maintain the ledge of the casting at a selected distance from the end of the sleeve, and a locking-bolt disposed within said compartment for being reciprocated radially of said tubular part for engaging with and being disengaged from the annular rack, to control rotatable movements of the hub.

3. In a locking device for the normally rotatable steering shaft, said shaft being provided with a hub and being disposed in a non-revoluble, tubular standard, a sleeve revoluble with the hub and provided with an annular rack, a casting having a tubular part circumscribing the sleeve and provided with a clamping-member, a second clamping-member, keepers engaging the clamping-members and adapted to be rotated for moving the second clamping-member in a direction of the first named clamping-member to secure said clamping-members in fixed relation with the standard, means to prevent a rotation of said keepers after the second clamping-member has been moved, and a locking-bar disposed transversely of the tubular part of the casting for moving into engagement with the annular rack to prevent a revoluble movement of said hub.

4. A locking device, comprising, in combination with a non-revoluble, tubular standard and a normally rotatable steering shaft provided with a hub and disposed in the standard, a sleeve rotatable with the shaft and hub and provided with an annular rack circumscribing the standard, a casting having a tubular part circumscribing the annular rack and provided with a clamping-member and an inwardly projecting annular ledge at the inner terminal of said tubular part, a second clamping-member, a pair of bolts engaging and being rotatable for pressing the casting upon the standard and to maintain the ledge of said casting adjacent to the annular rack, means for preventing a rotatable movement of said bolts after the casting has been pressed upon the standard, and a locking-bolt arranged to have a movement inwardly of the tubular part of the casting for engaging the annular rack to prevent a rotatable movement of said hub.

5. A locking device, comprising, in combination with a non-revoluble, tubular standard and a normally rotatable steering shaft provided with a hub and disposed in the standard, a sleeve revoluble with the hub and provided with an annular rack circumscribing the standard, a casting having a clamping-member provided with an impaling-element and having a tubular part circumscribing the annular rack, means to press the clamping-member and its impaling-element against the standard for maintaining said casting stationary with the standard and to maintain the casting in spaced relation with the sleeve, and a locking-bolt arranged to have a movement radially of the tubular part of the casting for engaging the annular rack to prevent a rotatable movement of said hub.

6. In a locking device for the normally rotatable steering shaft of an automobile, said shaft being provided with a hub and being disposed in a non-revoluble, tubular standard, a sleeve movable with the hub and provided with an annular rack, a casting provided intermediate its ends with an inwardly projecting, annular ledge and having a tubular part outwardly of said ledge circumscribing the sleeve and provided with a clamping-member, a second clamping-member, keepers engaging the clamping-members and adapted to be rotated for moving the second clamping-member in a direction of the first named clamping member to secure said clamping-members in fixed relation with a selected part longitudinally of the standard to maintain the annular ledge of said casting in spaced relation with the inner end of the sleeve, means to prevent a rotation of said keepers after the second clamping-member has been moved, and a locking-bar disposed transversely of the tubular part of the casting for moving into engagement with the annular rack to prevent a revoluble movement of the hub.

7. In a locking device for a normally rotatable steering shaft of the type described, said shaft being provided with a hub and being disposed in a non-revoluble, tubular standard, a sleeve revoluble with the hub, said sleeve being provided longitudinally thereof with elongated grooves and having stop-members at the ends of said grooves, a casting having a tubular part circumscribing the sleeve, clamping-members for securing the casting in fixed relation with the standard, a locking-bar carried by the tubular part of the casting for a movement within one of the grooves, said locking-bar having a width less than the distance between the stop-members to permit adjustments to be made of the casting longitudinally of the standard and to prevent a revoluble movement of the hub with reference to the standard.

8. In a locking device for a normally rotatable steering-shaft of the type described, said shaft being provided with a hub and being disposed in a non-revoluble, tubular standard, a sleeve revoluble with the hub, said sleeve being provided longitudinally thereof with elongated grooves and stop-members at the ends of the grooves, a casting having a tubular part circumscribing the sleeve, clamping-members for securing the casting upon and at selected longitudinal intervals of the standard, a locking-bar carried by the tubular part of the casting for a movement within one of the grooves intermediate the stop-members to prevent a revoluble movement of the hub and sleeve with reference to the standard and to permit said casting to be secured at said selected longitudinal intervals of the standard.

In testimony whereof I have affixed my signature in presence of two witnesses.

ARTHUR H. STURGES.

Witnesses:
HIRAM A. STURGES,
RAYMOND D. SELMOOR.